US009524346B2

(12) United States Patent
Berk et al.

(10) Patent No.: US 9,524,346 B2
(45) Date of Patent: Dec. 20, 2016

(54) PERSON-TO-PERSON VIEWING OF RECOMMENDED ITEMS AS GROUPED INTO CATEGORIES

(71) Applicant: Lucky Oyster, Inc., Seattle, WA (US)

(72) Inventors: Matthew Berk, Seattle, WA (US); Ryan Fritzky, Seattle, WA (US)

(73) Assignee: Lucky Oyster, Inc., Seattle, WA (US)

( * ) Notice: Subject to any disclaimer, the term of this patent is extended or adjusted under 35 U.S.C. 154(b) by 251 days.

(21) Appl. No.: 13/844,174

(22) Filed: Mar. 15, 2013

(65) Prior Publication Data
US 2014/0280176 A1    Sep. 18, 2014

(51) Int. Cl.
G06F 17/30  (2006.01)

(52) U.S. Cl.
CPC .............................. G06F 17/30867 (2013.01)

(58) Field of Classification Search
None
See application file for complete search history.

(56) References Cited

U.S. PATENT DOCUMENTS

| 7,668,821 | B1* | 2/2010 | Donsbach et al. ............ 707/765 |
| 2002/0178223 | A1* | 11/2002 | Bushkin ........................ 709/205 |
| 2009/0228296 | A1 | 9/2009 | Ismalon |
| 2009/0254541 | A1* | 10/2009 | Kolawa .................. G06Q 30/02 |
| 2011/0202406 | A1 | 8/2011 | Suomela |
| 2011/0211813 | A1* | 9/2011 | Marks ........................... 386/297 |
| 2012/0078830 | A1* | 3/2012 | Bodor et al. .................... 706/46 |
| 2012/0150598 | A1* | 6/2012 | Griggs ....................... 705/14.16 |
| 2012/0150971 | A1 | 6/2012 | Bahrainwala et al. |
| 2012/0151383 | A1 | 6/2012 | Kazan et al. |
| 2012/0323991 | A1* | 12/2012 | Wang et al. .................. 709/203 |
| 2013/0204740 | A1 | 8/2013 | Barbieri et al. |

OTHER PUBLICATIONS

Non Final Office Action for U.S. Appl. No. 13/844,297, mailed Sep. 12, 2013, 17 pages.
Notice of Allowance for U.S. Appl. No. 13/844,297, mailed Jan. 30, 2014, 5 pages.

* cited by examiner

Primary Examiner — Alex Gofman
Assistant Examiner — Umar Mian
(74) Attorney, Agent, or Firm — Perkins Coie LLP

(57) ABSTRACT

A system that allows individuals to maintain lists of items of interest in an account, such as books, restaurants, hotels, clothes, etc. An individual can mark items in their account as recommended, after which other individuals in their sharing network can view the recommended items as grouped into categories. Items are displayed with action links (e.g. for purchasing, reservations, mapping, etc.) In an explore view categories are displayed for all of the combined recommended items from all of the individuals in the viewer's sharing network. When a category is selected from the explore view, an indication is provided for each item as to the individual who marked the item as recommended. An individual viewing a recommended item may also save the item to their own account as one to try later. The distribution of items between individuals through recommendations can be temporally and geographically mapped to identify patterns of interest.

27 Claims, 17 Drawing Sheets

Item Data Structure

PERSON-TO-PERSON VIEWING OF RECOMMENDED ITEMS AS GROUPED INTO CATEGORIES

BACKGROUND

Individuals often seek answers to certain types of questions from their social network (i.e., via "word of mouth"). For example, an individual may ask one of their friends "Where should I take my wife on a date night?" "What movie should I rent?" or "Where should I go when I'm in New York?" Unfortunately, there is no efficient way to exchange this type of information using existing social applications or review sites, as the actionable answer—a specific product, place, experience, etc. is often lost in the full text of the response. It is also often challenging for individuals who are asked these types of questions to instantly recall the relevant items. For example, when asked, an individual may not be able to immediately recall the exact name of "a great book that they heard about," "a favorite sushi place," "where to stay in Sonoma," "a favorite Riesling," or "what to see in Vancouver." A need exists for an improved system and method for storing, sharing, and recommending these types of items.

DETAILED DESCRIPTION

Figure 1:
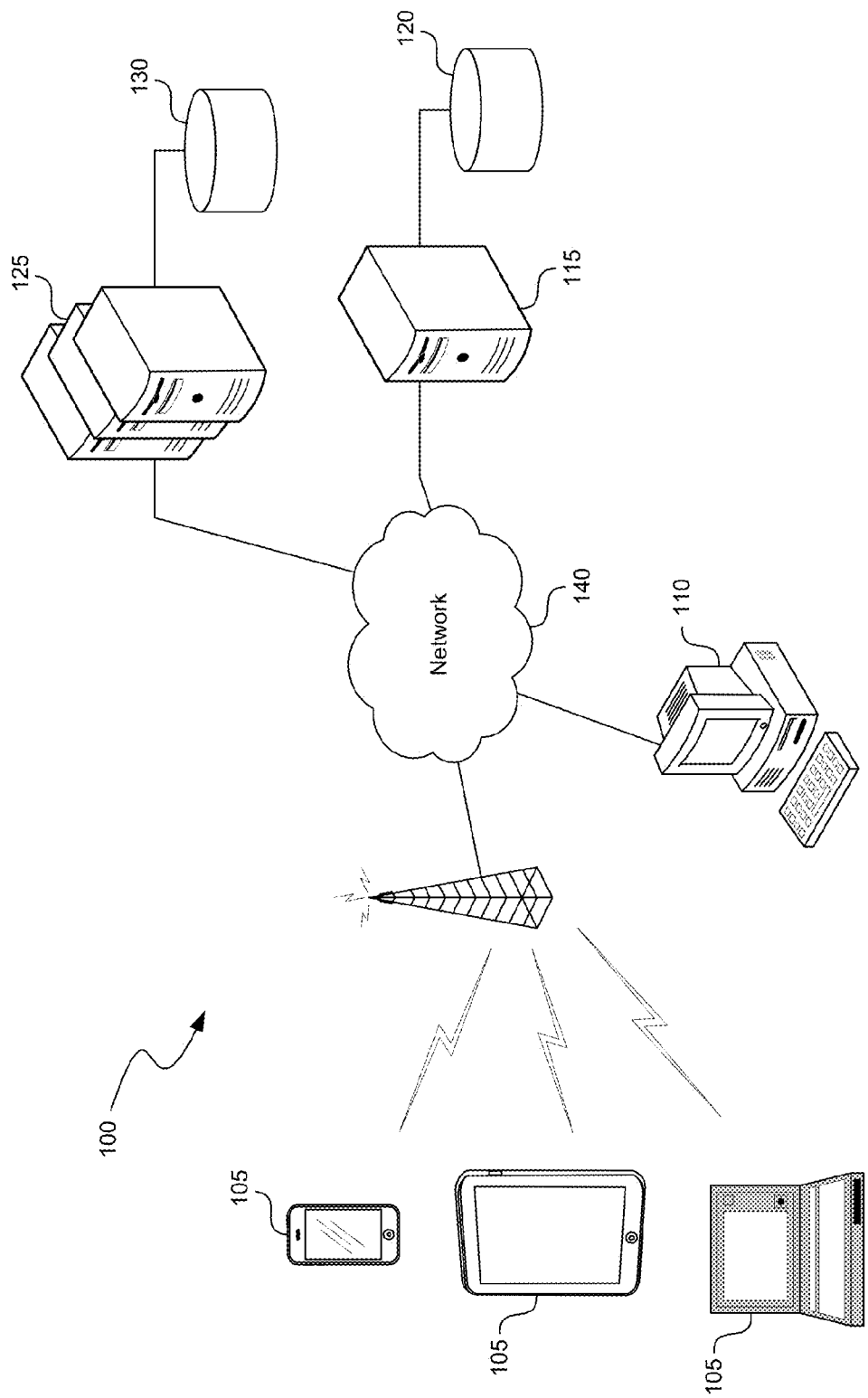
FIG. 1 is a diagram of a suitable environment in which a person-to-person item recommendation system may operate.

An item recommendation system that allows individuals to maintain lists of items of interest in an account and share or recommend those items to others is disclosed herein. An item is any virtual or physical object of interest to a user, such as books, restaurants, hotels, clothes, etc. An item may also be an experience or other activity that an individual can describe. Items are stored by the system in a meta-catalog of items, the meta-catalog being both a collection of items across all individuals that utilize the system as well as a reference collection of likely recommendable items. Items are deduplicated in the meta-catalog, so that each item is represented once in the collection. When an item is added by an individual to an individual's list, the individual is able to view a collection of information that characterizes that item. The information may include an image of the item, a location of an item, a description of the item, actions that may be taken on the item (e.g. for purchasing the item from an external website, making a reservation, mapping directions, etc.), and other information as will be set forth herein.

The system allows an individual to share an item in an individual's list with another individual. When an individual wishes to share an item, the system generates a share message to be sent by a selected method (e.g. email, Twitter, Facebook, SMS, etc.). The system also allows individuals to directly share with other individuals having accounts within the system, such as via a website or application running on a communication device of the individual. The share message includes information about the item being shared and a link or other mechanism to view the item. The message also provides a mechanism to allow the recipient to accept or decline the share. If the recipient accepts the share, the item is saved into an account associated with the recipient. The acceptance or the rejection of the share establishes a positive or negative relationship between each individual (the sharer and the recipient) and the item. In some embodiments, an individual may also be able to share a category- or location-based list of items with another individual. For example, an individual might share all restaurants they have stored for New York City if a friend were going to visit that city.

In addition to making a specific recommendation by sharing, an individual can also mark items in their account as recommended. Once marked as recommended, other individuals in their sharing network can view the recommended items, subject to the two individuals being already connected by virtue of a shared and accepted item or items between them. An explore view may be provided in which categories are displayed for all of the combined recommended items from all of the individuals in the viewer's sharing network. When a category is selected from the explore view, the items in the category are displayed, and an indication is provided for each item as to the individual or individuals who marked the item as recommended. An individual viewing a recommended item may also save the item to their own account for future reference or action (e.g., sharing, recommendation, purchase). The saving of the recommendation establishes a positive relationship between each individual (the recommender and the recipient) and the item.

A sharing network is created for each individual by the system, where the sharing network is the network of individuals that an individual has affirmatively shared and item with or accepted an item share from. Every bond between individuals may be characterized by the items that have been shared between the individuals, with additional information gleaned about each individual as a result of subsequent actions by the individual (e.g., re-sharing an item, purchasing an item, later deleting an item, recommending an item, etc.). Items distributed between individuals through sharing and recommendations can be temporally and geographically mapped to identify patterns of interest. Timestamps are recorded for actions related to saving, sharing and recommending items. Each item may be recorded in and linked through the meta-catalog, through which an item can be tracked as it is recommended and shared through different sharing networks. In various applications, the data obtained from tracking items may be utilized for purposes such as determining the value or relevance of an item, the strength of a bond between people, the reactions of certain individuals to certain types of recommendations, etc. Once such information is determined, it may be utilized for purposes such as recommending items, determining which individuals are best to ask for recommendations, determining the receptivity of certain individuals to certain types of recommendations, etc.

It will be appreciated that the disclosed system and method provides mechanisms similar to those of traditional "word of mouth" interactions between individuals. These types of interactions are considered to be advantageous over those of existing systems, in that a recommendation from someone who an individual knows and trusts will often mean more to the individual than an aggregation of anonymous opinions, ratings, and reviews. Individuals experience a positive social interaction when they are able to share an item that they value highly (e.g. a "pearl" of an item). Additional layers of recommending and sharing of an item may be recorded and for certain applications may be considered to increase the overall value of the item.

Various embodiments of the invention are described below. The following description provides specific details for a thorough understanding and an enabling description of these embodiments. One skilled in the art will understand, however, that the invention may be practiced without many of these details. In addition, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 and the following discussion provide a brief, general description of a suitable computing environment in which a person-to-person item recommendation system 100 can be implemented. Although not required, aspects and implementations of the invention will be described in the general context of computer-executable instructions, such as routines executed by a general-purpose computer, a personal computer, a server, or other computing system. The invention can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

The system and method can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the invention described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to the example of FIG. 1, a person-to-person item recommendation system 100 operates in or among mobile devices 105, personal computers 110, and one or more server computers 115. The mobile devices 105 and personal computers 110 communicate through one or more wired or wireless networks 140 with the server 115. A data storage area 120 contains data utilized by the person-to-person item recommendation system, and, in some implementations, software necessary to perform functions of the. For example, the data storage area 120 may contain the meta-catalog of items that is maintained by the system, accounts for individuals where items are saved, as well as tracking data for the sharing and recommendation of items. As will be described in more detail below, the server 115 typically contains one or more programs for implementing the person-to-person item recommendation system.

The person-to-person item recommendation system communicates with one or more third party servers 125 via public or private networks. The third party servers 125 include servers maintained by businesses that periodically provide relevant information to the server 115. For example, some servers make data related to items (e.g. books, restaurants, etc.) that are saved in individual accounts available to the person-to-person item recommendation system 100. The third-party servers may also be utilized for making the items actionable. For example, an individual may be provided links by which to purchase an item, make reservations at the item, map driving directions to the item, etc.

Mobile devices 105 and personal computers 110 may be utilized by individuals for accessing their accounts on the server 115, viewing recommended items in other individual's accounts, accessing other websites related to items, sending and receiving share messages, etc. The mobile devices 105 and personal computers 110 may have a dedicated software application that allows user to access their accounts on server 115, of the accounts may be accessed through multi-purpose software applications such as a web browser like Firefox™. The mobile devices 105 and computers 110 communicate with each other and the server 115 and third party servers 125 through public and private networks 140, including, for example, the Internet. The mobile devices 105 communicate wirelessly with a base station or access point using a wireless mobile telephone standard, such as the Global System for Mobile Communications (GSM), Long Term Evolution (LTE), or another wireless standard, such as IEEE 802.11, and the base station or access point communicates with the server 115 and third party servers 125 via the networks 140. Personal computers 110 communicate through the networks 140 using, for example, TCP/IP protocols.

Figure 2:
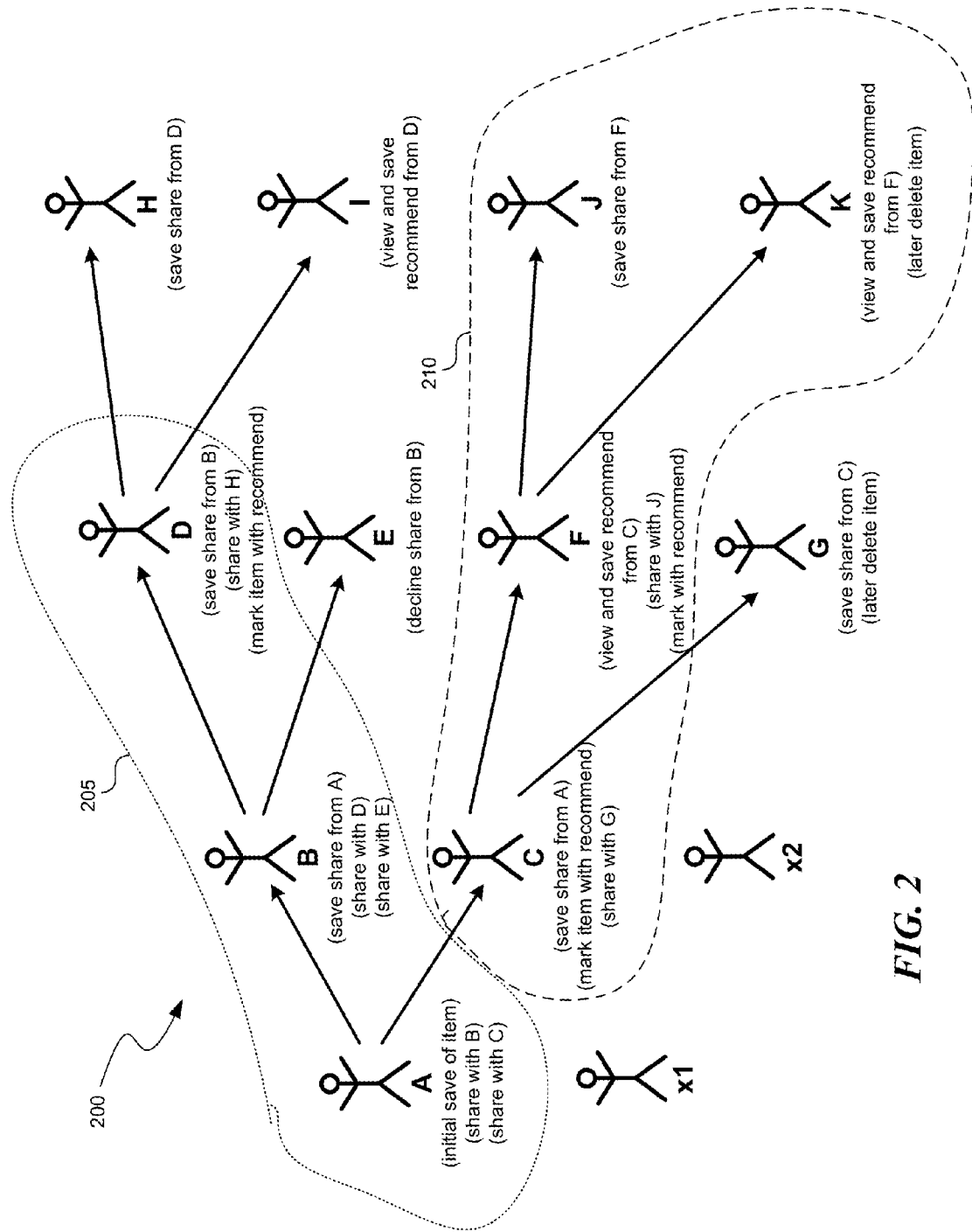
FIG. 2 is a diagram illustrating the distribution of an item through person-to-person sharing and recommendations.

FIG. 2 is a diagram of a group of individuals 200 illustrating the propagation of an item through person-to-person sharing and recommendations. As shown in FIG. 2, the group of individuals 200 includes individuals A-K who have established sharing networks with each other. As will be described in more detail below, a sharing network is built by establishing one-to-one bonds between individuals based on an accepted share of an item and characterizing the bonds based on aggregate actions between the individuals and specific items. An accepted share of an item occurs when one individual shares an item with another individual, and the other individual accepts the item share. Until an item share and accept occurs, there is no bond established between individuals. Once the one-to-one bond is established between the two individuals, each individual is allowed to view recommended items of the other. A sharing network constructed in this fashion is distinct from typical social networks because it depends on an affirmative interaction between the individuals with respect to an item that can be used to characterize the bond between the individuals. Individuals X1 and X2 are illustrated as other individuals who are outside of any sharing network and are not part of the current distribution of the item through the interconnected sharing networks, but who may later become part of one or more of the sharing networks.

As shown in FIG. 2, an individual A performs an initial save of an item of interest, such as a book, restaurant, hotel, clothes, etc. to an account of the individual that is maintained by the system 100. An example process for an initial save of an item to an individual's account will be described in more detail below with respect to FIGS. 5A-5C. After the item has been saved to individual A's account, individual A then shares the item with individuals B and C. An example process for sharing an item from one individual's account with another individual will be described in more detail below with respect to FIGS. 6A-6C.

Once individual B receives the share from individual A, individual B accepts the share and saves the item into individual B's account. An example process for accepting a share and saving an item that has been shared from another individual's account will be described in more detail below with respect to FIG. 6D. Individual B is also shown to subsequently share the item with individuals D and E.

Individual C, who also received the share of the item from individual A, accepts the share and saves the item into individual C's account. Individual C also subsequently marks the item with "recommend," and shares the item with individual G. An example process for an individual marking an item as recommended will be described in more detail below with respect to FIG. 7.

Once individual D receives the share from individual B, individual D accepts and saves the item into individual D's account. Individual D also subsequently shares the item with individual H, and marks the item as recommended. In contrast, individual E declines the share of the item from individual B. An example process for declining a share from another individual will be described in more detail below with respect to FIG. 6D.

Individual F views and saves the recommended item from individual C's account into individual F's account. Individual F also subsequently shares the item with individual J, and marks the item as recommended in individual F's account. An example process for viewing and saving a recommended item from another individual's account will be described in more detail below with respect to FIGS. 8A-8D, 9A, 9B and 10A-10C. Individual G accepts the share from individual C and saves the item into individual G's account, but also later deletes the item from individual G's account. As will be described in more detail below, the saving and deleting of items may be tracked by the system 100 in addition to the acceptances and declines of shares.

Individual H accepts the share of the item from individual D, and saves the item into individual H's account. Individual I views and saves the recommended item from individual D's account into individual I's account. Individual J accepts the share of the item from individual F, and saves the item into individual J's account. Individual K views and saves the recommended item from individual F's account into individual K's account, but is also shown to later delete the item. As will be described in more detail herein, the data obtained from tracking actions such as those illustrated in FIG. 2 may be utilized by various applications.

By virtue of the sharing of items between individuals, many sharing networks are created in FIG. 2. As an example, a first representative sharing network 205 is created for individual B as result of two different shares. A new bond is established between individual A and individual B as a result of the item share between A and B and the acceptance by individual B. A new bond is also established between individual B and individual D as a result of the item share between B and D and the acceptance by individual D. In contrast, a bond is not established between individual B and E because E declined the shared item. Individual B's sharing network therefore includes individuals A and D. As another example, a second representative sharing network 210 is created for individual F as a result of three different present or past shares. A new bond is established between individual F and J as a result of individual F sharing an item with individual J and individual J accepting the shared item. A past accepted share between individual F and individual C is indicated because individual F is able to see recommendations by individual C. Similarly, a past accepted share between individual F and individual K is indicated because individual K is able to see recommendations by individual F. Individual F's sharing network therefore includes individuals C, J, and K. It will be appreciated that sharing networks may grow and shrink over time as individuals share new items and sever bonds with other individuals. Moreover, sharing networks will naturally overlap as a result of the different social circles that individuals have in common.

Figure 3:
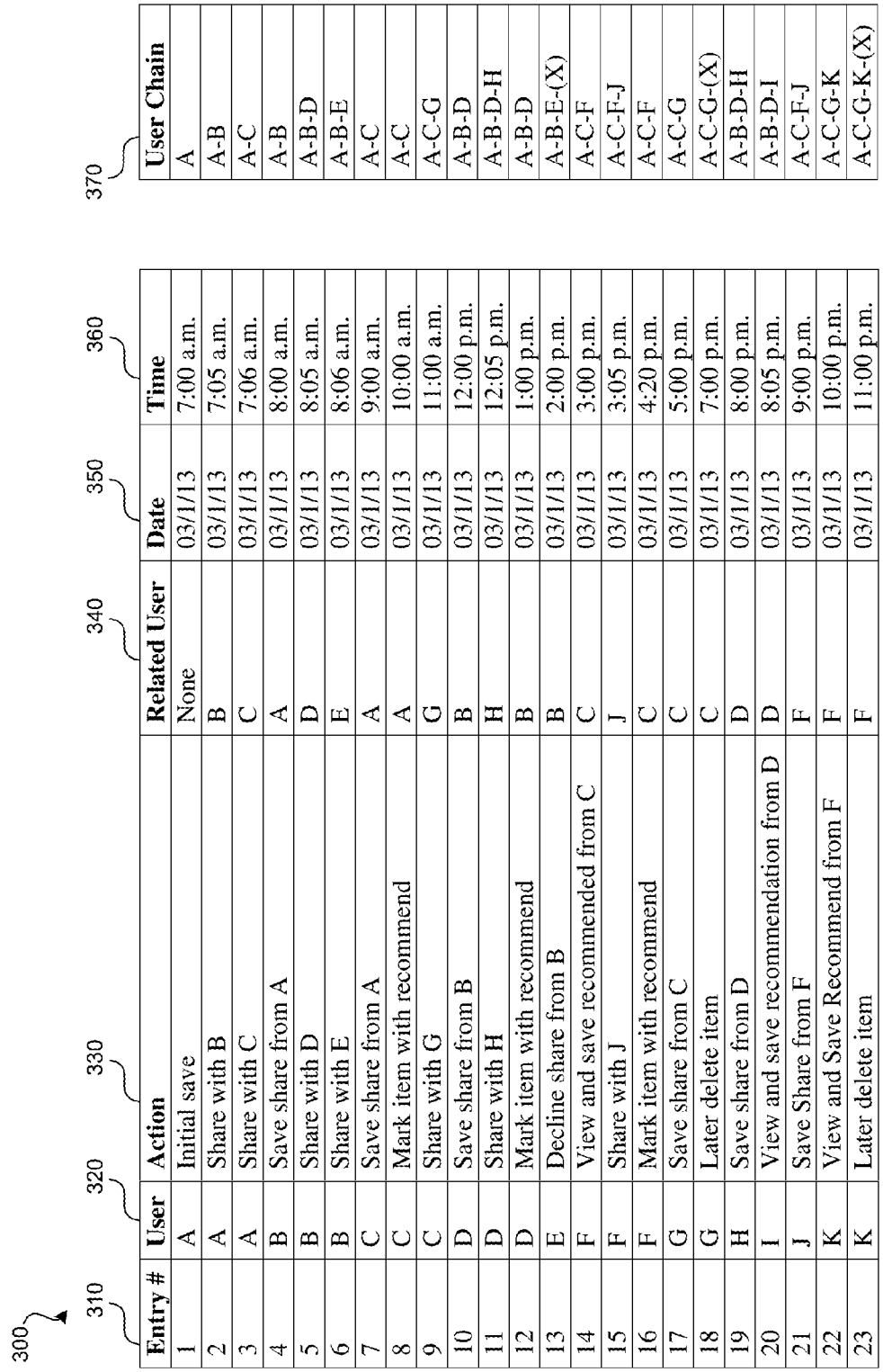
FIG. 3 is a diagram of a tracking table illustrating actions associated with the propagation of the item of FIG. 2.

FIG. 3 is a diagram of a representative tracking table 300 used by the system 100 for recording each action associated with the propagation of an item through sharing networks. The data used to populate the representative tracking table 300 is derived from the actions taken in the sharing networks of FIG. 2. Each row in tracking table 300 reflects a different action that is associated with the tracked item. As shown in FIG. 3, the tracking table 300 includes an entry number field 310 that is a unique identifier assigned to track each item action. The action is characterized in three fields, namely a user designation field 320 that contains a representation of who initiated the action, an action designation field 330 that contains a description of the action (e.g., share, recommend, save), and a related user designation field 340 that contains the recipient of the action or other party impacted by the action. A timestamp of the item action is stored by the system in a date field 350 and a time field 360. A separate field 370 is shown to illustrate a complete user chain for the distribution of an item up to a given point in time, which may in certain implementations be derived from the sequence of actions indicated in the tracking table 300 as opposed to being expressly recorded.

Figure 4:
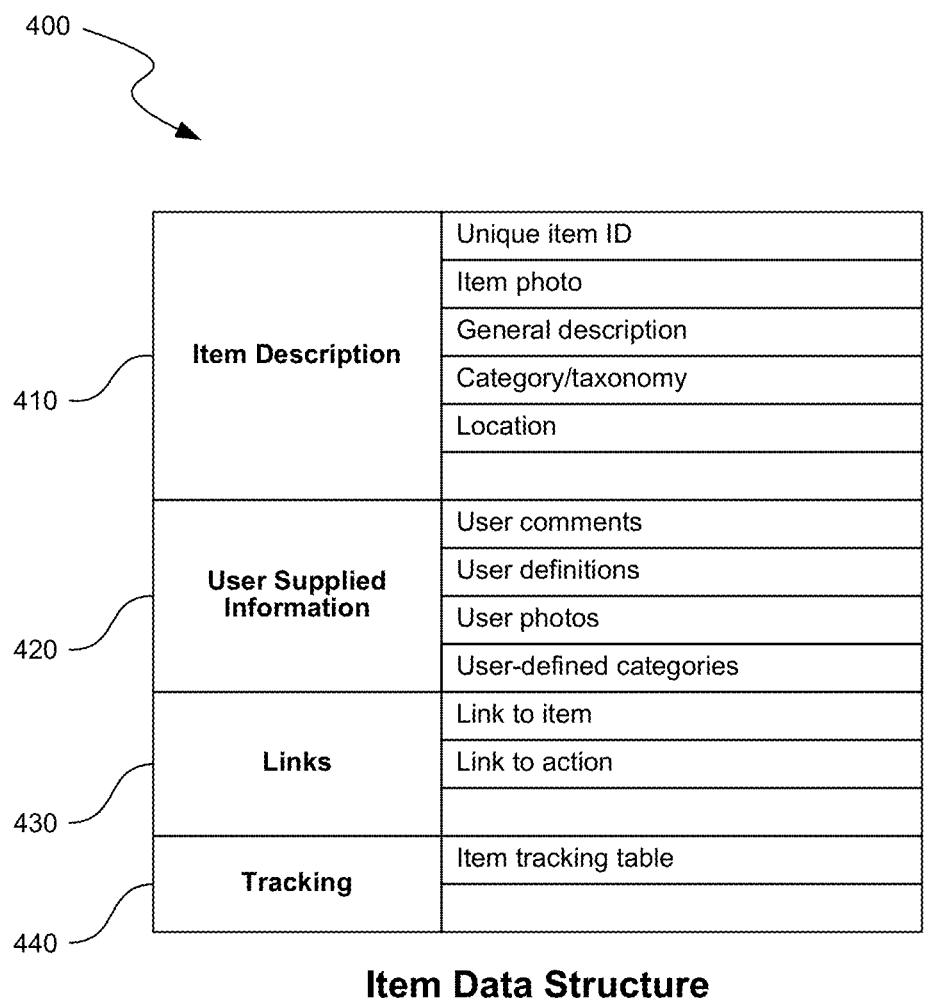
FIG. 4 is a diagram of a data structure table illustrating recorded data for the item of FIG. 2.

While FIGS. 3 and 4 depict tables whose contents and organization are designed to make them more comprehensible by a human reader, those skilled in the art will appreciate that the actual data structure(s) used by the system to store this information may differ from the tables shown, in that they, for example, may be organized in a different manner, may contain more or less information than shown, may be compressed and/or encrypted, and may be optimized in a variety of ways.

It will be appreciated that the tracking of the actions associated with the propagation of an item through sharing networks (such as those illustrated in FIG. 3) may be utilized for various applications. In general, tracking actions such as recommendations, shares, acceptances, declines, saves, deletions, etc. provide indications of not only the relevance of an item, but of the strength of a bond between individuals. For example, the initial strength of a bond between two individuals may be indicated by the number of items recommended or saved, the number of acceptances or declines, etc. Subsequent actions by an individual (e.g., re-sharing an item, purchasing an item, later deleting an item, recommending an item, etc.) may then strengthen or weaken that bond. Some subsequent actions may strengthen the positive relationship between the recommender and the recipient (e.g., re-sharing an item) while some subsequent actions may weaken the positive relationship between the recommender and the recipient (e.g., deleting an item). As one example, when an individual has accepted an item share and then subsequently recommends the item, the system may assume that the individual has used or otherwise experienced the item and therefore increase the strength of the initial bond between individuals.

In some embodiments, a simple numerical count may be made of shares made, shares accepted, shares rejected, etc. may be maintained by the system 100 for each individual. The system may then add an incremental value (e.g., +0.25) for each positive subsequent action or subtract an incremental value (e.g., −0.25) for each negative subsequent action associated with the bond. A bond between two individuals may be characterized in one dimension (e.g., a scalar value, a characterization as "strong," "medium," or "weak") or a bond may be a multi-dimensional measure of the relationship between the individuals, such as a characterization across multiple categories of items shared between the users (e.g., a "strong" bond between two individuals on media but a "weak" bond on restaurants). One skilled in the art will appreciate that the disclosed scoring system is merely representative, and that other methods to calculate the strength of bonds between individuals can be readily applied to achieve the desired result.

In addition to characterizing bonds between individuals, the system 100 is able to characterize the value of items in the meta-catalog. The value of an item may be represented by the number of times it has been successfully shared, or successfully recommended and saved. A numerical score may periodically be calculated by the system for an item (e.g., daily, weekly, monthly), with the score reflecting the number of times that the item was successfully shared or recommended. By calculating a derivative of the resulting item data series, the system 100 can assess the relative value of an item to one or more sets of individuals or sharing networks. Steep increases in scores reflect "hot" items that are rapidly propagated through sharing networks. Slow increases in scores reflect "cold" items that are slowly propagated through sharing networks. The system may provide such information to businesses, marketers, or other parties that are interested in identifying industry trends.

Various interpretations may be drawn from such data, such as the effectiveness of a recommender generally, or of a recommender for certain kinds of recommendations in particular. For example, Information characterizing the quality of a recommender may be calculated by the system based on the ratio of shares to accepts and/or declines, the ratio of recommendations to views and saves by others, etc. The strength of a bond between individuals may be derived for certain types of items, or for certain kinds of recommendations in particular. Similar determinations regarding a sharing network as a whole may also be determined. With regard to the items themselves, the quality and/or popularity of an item and relationships between items may also be determined through the analysis of such data. Once such information is determined, it may be utilized for purposes such as recommending items, determining which individuals are best to ask for recommendations, determining the receptivity of certain individuals to certain types of recommendations, etc.

FIG. 4 is a diagram of a representative data structure table 400 that illustrates data characterizing an item that may be stored by the system 100 in the item meta-catalog. As shown in FIG. 4, the item data structure table 400 is organized according to general categories for entries, including item descriptions 410, user-supplied information 420, links 430 and tracking 440. The item descriptions 410 include a unique item ID field, an item photo field, a general description field, a category/taxonomy field, and a location field. The user-supplied information 420 includes a user comments field, a user definitions field, a user photos field, and a user-supplied categories field. The user-supplied information fields are populated with information that individuals use to characterize an item when the item is stored in the account of the individual. The links 430 include a link to the item field and a link to an action field. Examples of links to actions include links for buying from an external website, getting directions, reading reviews, getting show times, reserving a table, etc. The tracking 440 includes an item tracking table field, which contains a link to a data structure used to track sharing or recommendation of the item, such as the table 300 illustrated in FIG. 3. Specific examples of the entries in the item data structure table 400 will be illustrated and described in more detail below with respect to FIGS. 5A-10C.

To initially populate the meta-catalog, the system may collect items and item descriptions from commonly-available datasets of books, music, the arts, businesses, etc. To the extent allowed by the quality of the data, the system deduplicates items in the meta-catalog so that each item is represented only once in the catalog. As will be described in additional detail herein, when a user wants to add an item to lists that they maintain, the system searches the meta-catalog and returns items that most closely match the item description provided by the user (e.g., title, location, keyword). If none of the items in the meta-catalog match that of interest to the user, the user is allowed to add a new item to the meta-catalog. In this fashion, the meta-catalog grows to include unique and unusual items such as "best view in San Francisco" or "great place in Golden Gate Park for a nap." When adding an item to the meta-catalog, the user may select a system categorization or may recommend that a new category be added to the meta-catalog. Such recommendations may be vetted by a system operator or by a community of system users who select new categories based on consensus.

Figure 5A:
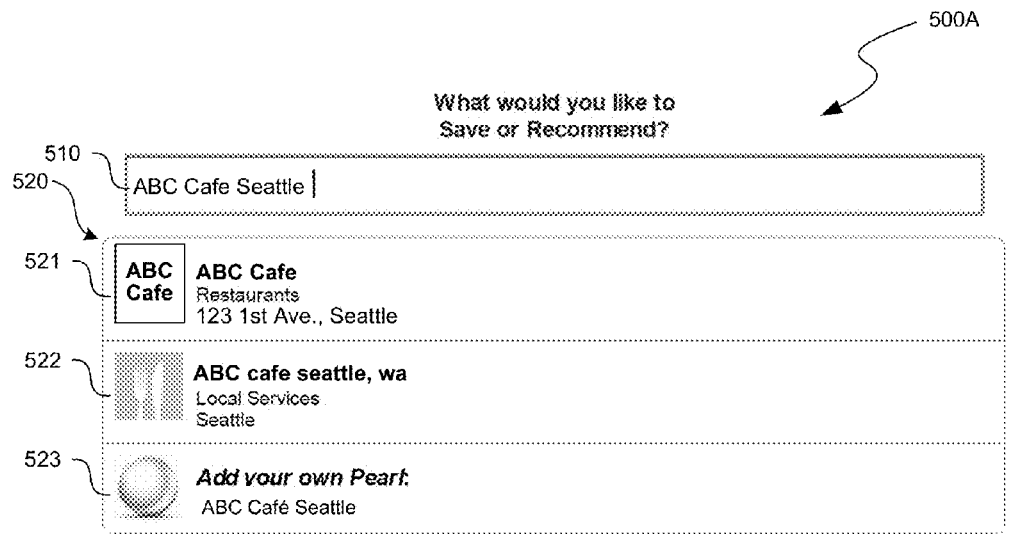
FIGS. 5A-5C are diagrams of screen displays illustrating an initial save of an item to an individual's account.
Figure 5B:
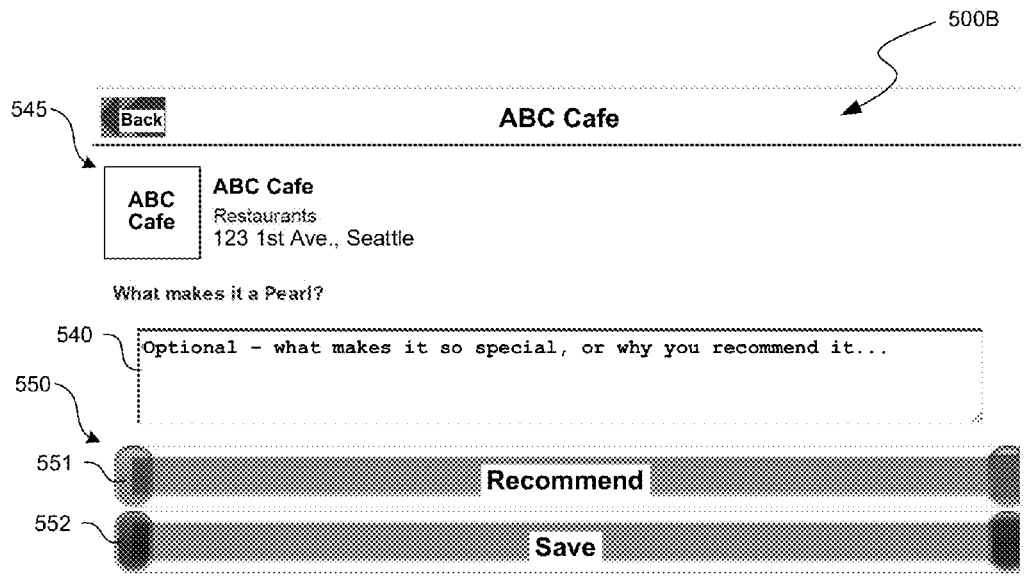
Figure 5C:
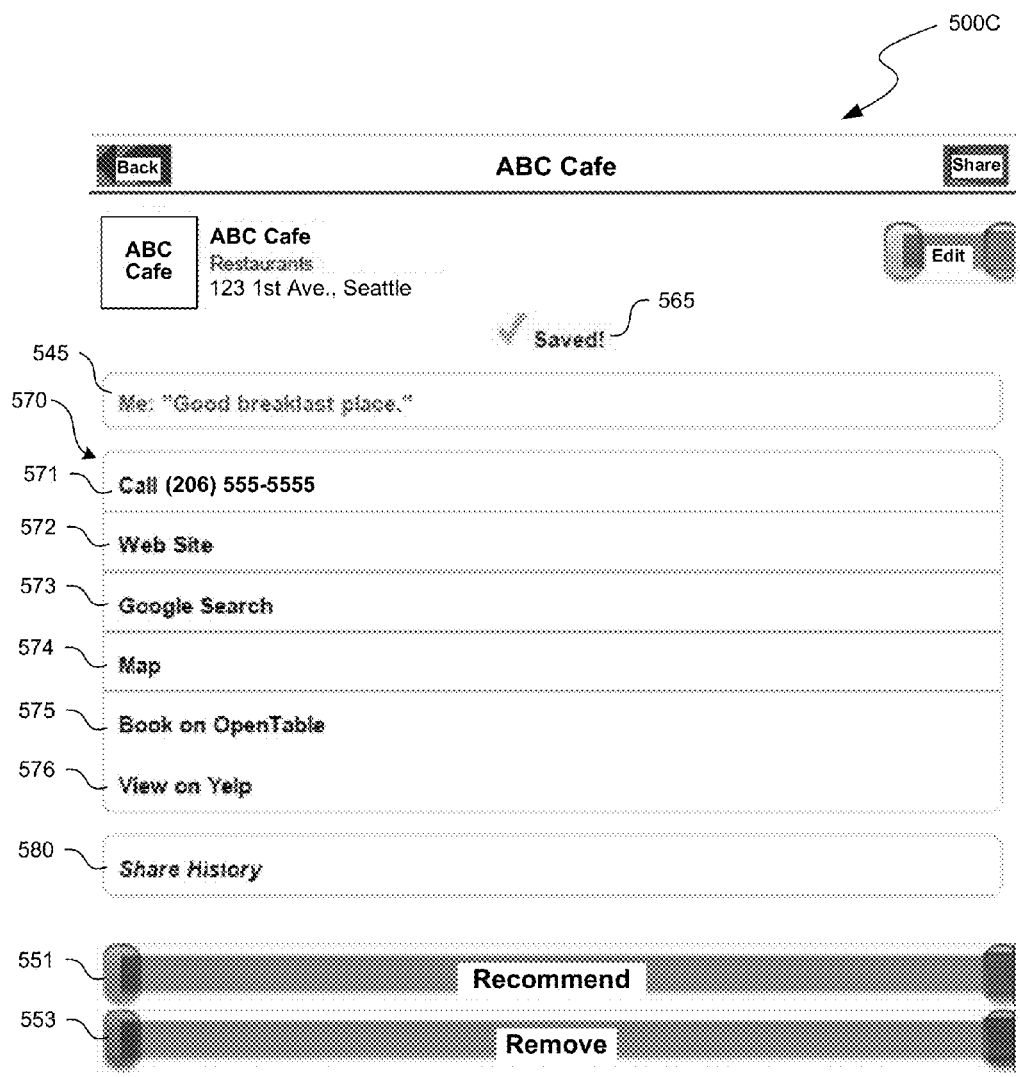

FIGS. 5A-5C are diagrams of screen displays 500A-500C generated by the system 100 and illustrating an initial save of an item to an individual's account. As shown in FIG. 5A, the screen display 500A includes an input field 510 where an individual may begin typing the name of an item that they would like to initially save or recommend. As will be described in more detail below, an individual may save an item that they have discovered and have used, an item they have discovered and wish to try later, an item that a friend has previously recommended, etc. Once an individual has typed the name of an item in the input field 510, a search engine may be utilized to search the meta-catalog of items and populate the results in a results region 520. As an example, once an individual has typed in an entry such as "ABC Café Seattle", the results region 520 may display a first result 521 for "ABC Café Restaurant" and a second result 522 for "ABC Café local services". An "add item" region 523 is also provided for adding an entirely new item to the system. That is, if the item searched by the individual is not found in the meta-catalog of items maintained by the system, the individual is provided an option to characterize the item and have it added to the meta-catalog.

As shown in FIG. 5B, a screen display 500B is provided once a result has been selected from the results region 520 of FIG. 5A (e.g., the result 521 for "ABC Café Restaurant"). A short description 545 of the selected item is displayed by the system 100, which may include a picture or image representative of the selected item. A description field 540 is provided for adding notes about the item, including a description of why the item is desirable or why it is recommended. Action buttons 550 include a recommend button 551 for recommending an item, and a save button 552 for saving an item. The selection of the save button 552 for saving the item will be described in more detail below with respect to FIG. 5C, and the selection of the recommend button 551 for recommending the item will be described in more detail below with respect to FIG. 7.

As shown in FIG. 5C, a screen display 500C is generated by the system after the save button 552 has been selected in FIG. 5B for saving the item. An indicator 565 is provided to indicate that the item has been saved. A description window 545 is provided for displaying elements such as the comments typed in by an individual in the window 540 of FIG. 5A, the identity of an individual who shared or recommended an item, or other information about the item. An action link area 570 includes action links 571-576 for performing certain actions with respect to the item. The specific action links include a call action link 571, a website action link 572, a search action link 573, a map action link 574, a reservation action link 575, and a view on a business reviews action link 576. The action links that are displayed by the system will depend, in part, on the type of item that is displayed. For example, an item that is a restaurant may offer a map link and a reservation link, however an item that is a book may offer a link to purchase the book. A window area 580 is provided for displaying the user's history of sharing the item. In certain implementations, the share history may indicate one or more individuals who have shared the item, comments that have been made, etc.

In addition to the recommend button 551 for marking an item as recommended, a remove button 553 is also provided for removing the item from an individual's account. It will be appreciated that the remove button 553 is generally provided after an individual has utilized the save button 552 of FIG. 5B to save the item to their account. After an item has been saved into an individual's account, the remove button 553 for removing the item may replace the save button 552 for saving the item.

Figure 6A:
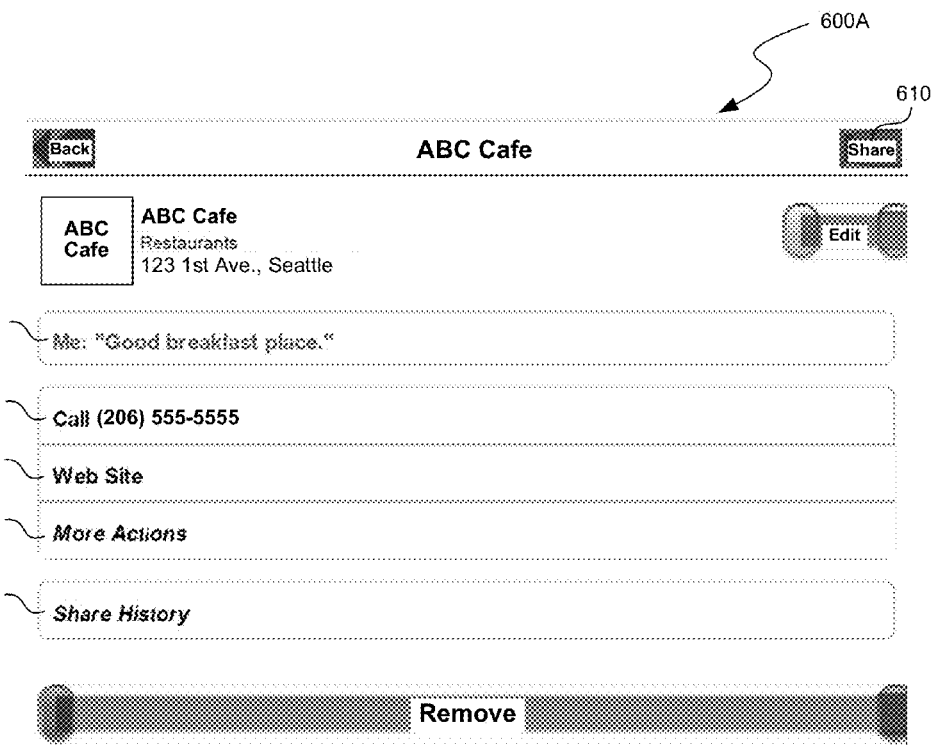
FIGS. 6A-6D are diagrams of screen displays illustrating the sharing of an item from one individual's account with another individual.

FIGS. 6A-6D are diagrams of screen displays 600A-600D generated by the system 100 and illustrating the sharing of an item from one individual to another individual. FIG. 6A is a representative screen display 600A is generated by the system 100 and presented to the individual when the individual selects an item in their own account to view. A share button 610 is provided for initiating a process for sharing the displayed item with another individual. Additional action links for the item may be displayed by the selection of an expansion button 620.

After an individual has selected the share button 610 of FIG. 6A, the individual is presented a screen display 600B by the system. The screen display 600B provides various options for sharing the item. More specifically, the display includes an email option 631, a social media option 632, and a broadcast messaging option 633. A cancel option 634 is also provided for cancelling the share process. The individual is thereby prompted for the particular mechanism that they would like to use to share the selected item. When the individual selects the sharing mechanism, they are prompted (not shown) to enter the intended recipient and provide any comments that they would like to provide about the item. The system then generates and transmits a sharing request to an intended recipient.

Figure 6B:
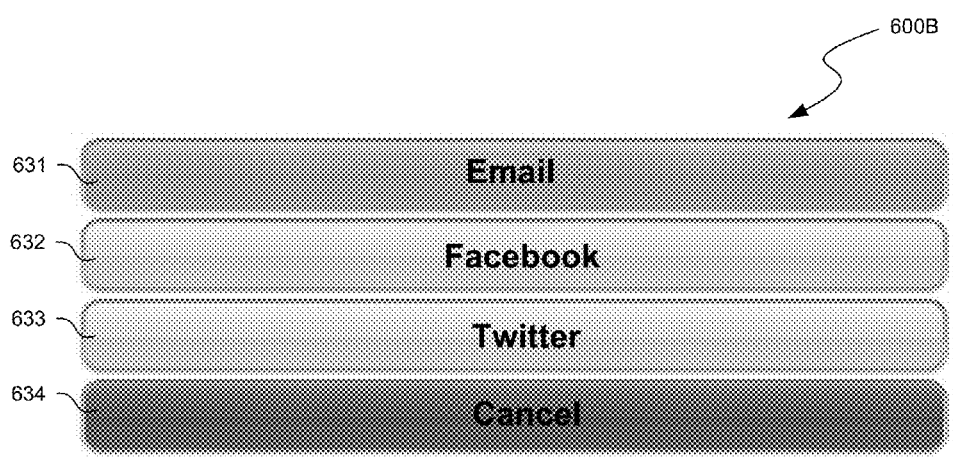
Figure 6C:
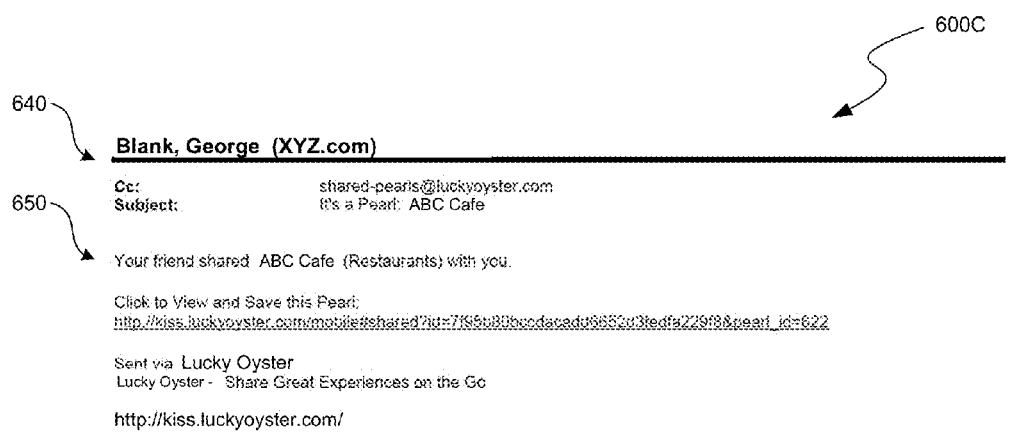

FIG. 6C is a representative screen display 600C of a sharing message generated by the system that a recipient receives after an individual selects the email option 631 of FIG. 6B. The sharing message includes a header 640 and a message body 650. The header 640 includes information such as the e-mail account from which the sharing message was sent and a subject line indicating the item that is being shared. The message body 650 includes description section with a description of the item and a message such as "your friend has shared ABC Café (Restaurant) with you." The message body may also include a link directing the recipient to the person-to-person item recommendation system 100. The sharing message in FIG. 6C is representative of a message sent by the system when the individual has selected the email option. It will be appreciated that other types of messages are generated by the system when a different sharing option is selected by the individual. The generated sharing message will typically include an identification of the individual that initiated the share, an indication of the item being shared, and a call to action by the recipient.

Figure 6D:
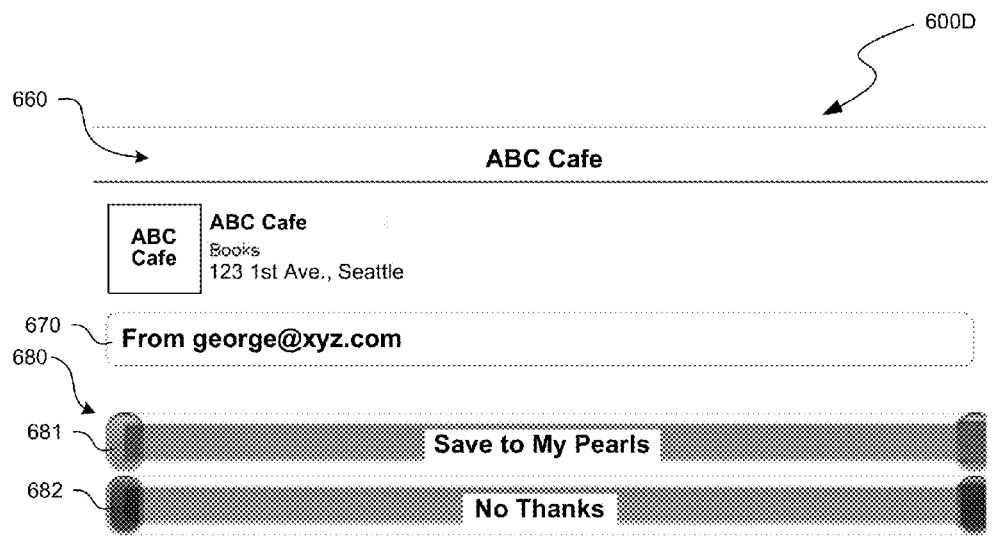

FIG. 6D is a representative screen display 600D that is generated by the system and provided to a recipient after the recipient has clicked on the share link in the sharing message of FIG. 6C. A description area 660 includes a description of the item. A sharer field 670 indicates the individual who shared the item. An action button area 680 includes an action button 681 for allowing an individual to save the item to their own account, and an action button 682 for allowing an individual to decline the share, by selecting "no thanks" or a similar decline indication. As described above, the selection of one of the action buttons 681 or 682 for accepting or declining the share may be recorded as indicating a positive or negative association between the individual and the item. After accepting a shared item, the system 100 presents the individual with a detail page directed item such as the screen display 500C as depicted in FIG. 5C.

While FIGS. 6A-6D contemplate that an individual will share only a single item, the system 100 may also support the sharing of multiple items with other individuals. For example, an individual may want to share a list of the "favorite restaurants in London" that they maintain. As another example, an individual may want to share a list of "best historical fiction novels" that they have read. To share multiple items, an individual may select a category, list, or other grouping of item and indicate to the system that that all items in the selected group are to be shared with another individual. The system 100 generates a sharing message that is sent to the intended recipient. As with an individual item, the recipient is given the option to either accept the shared group of items or decline the shared group of items. In some embodiments, the accept or decline is made on the group of shared items as a whole. In some embodiments, the accept or decline may be made on an item-by-item basis for each item in the group of shared items. For each of the shared items in the group that is accepted, whether individually or in its entirety, the system establishes an association between the sending individual, the receiving individual, and the item.

Figure 7:
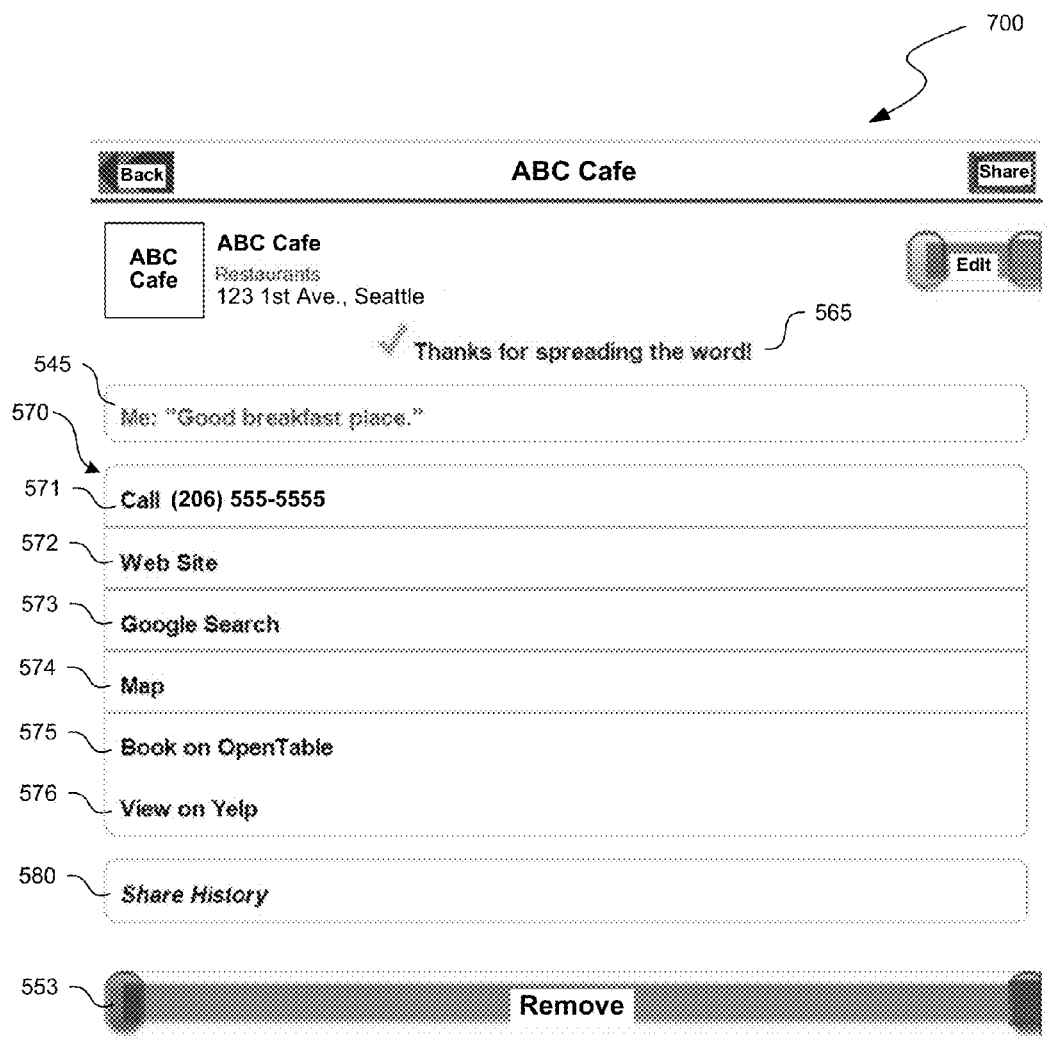
FIG. 7 is a diagram of a screen display illustrating an item being marked as recommended in an individual's account.

FIG. 7 is a diagram of a representative screen display 700 illustrating an item being marked as recommended in an individual's account. A recommendation is a general indication of an individual's interest in an item to other people that are in the individual's sharing network. The screen display 700 is provided when an individual selects the recommend button 551 of FIG. 5B or 5C for recommending the item. In some embodiments, once a user has marked an item as recommended, other individuals in the individual's sharing network are able to view the recommended item as associated with the individual's account. An indicator area 565 confirms that the item has been marked as recommended by providing a confirmation message, such as "Thanks for spreading the word!" Once an item has been saved and recommended, the save button 551 and recommend button 552 are no longer displayed, and only the remove button 553 for removing an item from an individual's account is displayed. Alternatively, the system may include a "stop recommendation" button (not shown) to allow an individual to retract a previous recommendation that has been made about an item.

Figure 8A:
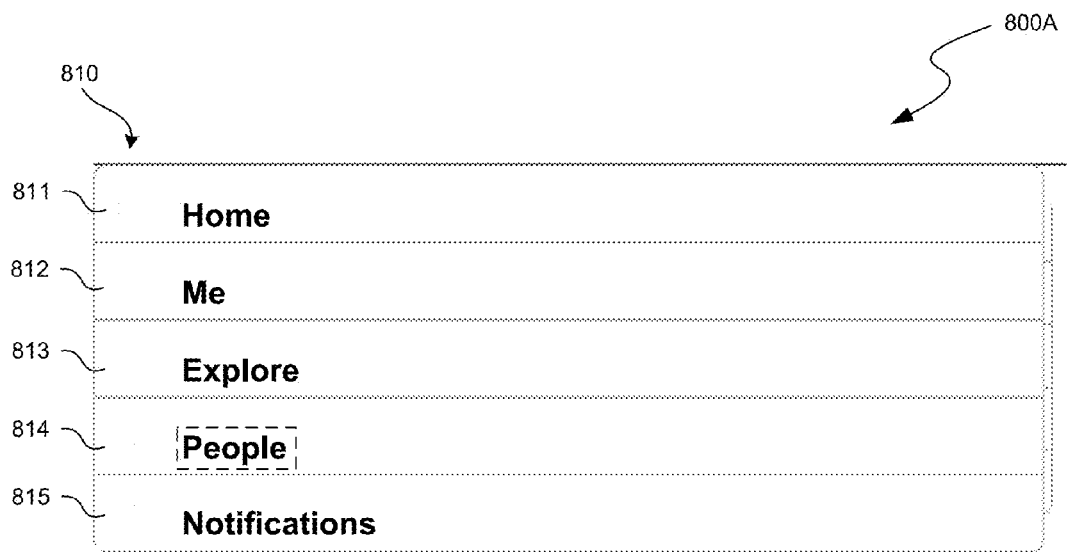
FIGS. 8A-8D are diagrams of screen displays illustrating the viewing of recommended items in the account of an individual who is part of the viewer's sharing network.

FIGS. 8A-8D are diagrams of representative screen displays 800A-800D illustrating the viewing of recommended items in the account of an individual who is part of the recommender's sharing network. As shown in FIG. 8A, a screen display 800A with a drop down menu 810 is provided. The drop down menu 810 includes menu options for home 811, me 812, explore 813, people 814, and notifications 815. The menu options for people 814 and explore 813 will be described in more detail below with respect to FIGS. 8B-8D and 9A-9B, respectively.

Figure 8B:
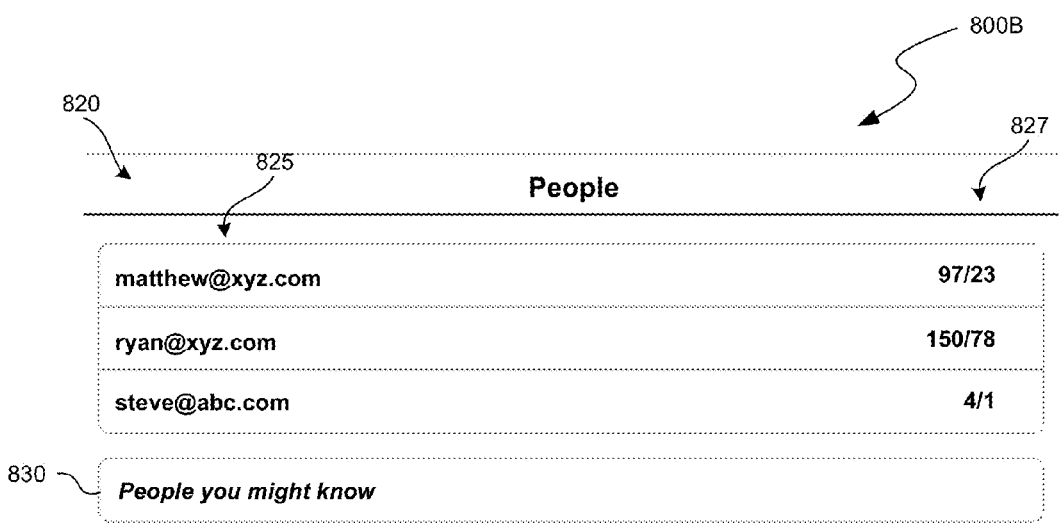

FIG. 8B is a representative screen display 800B that is generated after an individual has selected the menu option for people 814 from FIG. 8A. A list 820 is displayed of individuals who are in the individual's sharing network. The list 820 includes a column 825 for the identities of the individuals, and a column 827 indicating a number of saved items that each individual has in their accounts, relative to a number of recommended items. The overall number of saved items as well as the ratio of the number of items marked as recommended may provide an indication as to how actively an individual is utilizing the system and as to how selective the individual is about marking items as recommended. A window area 830 is provided for suggesting other individuals that an individual may also know, who they may also wish to invite into their sharing network.

Figure 8C:
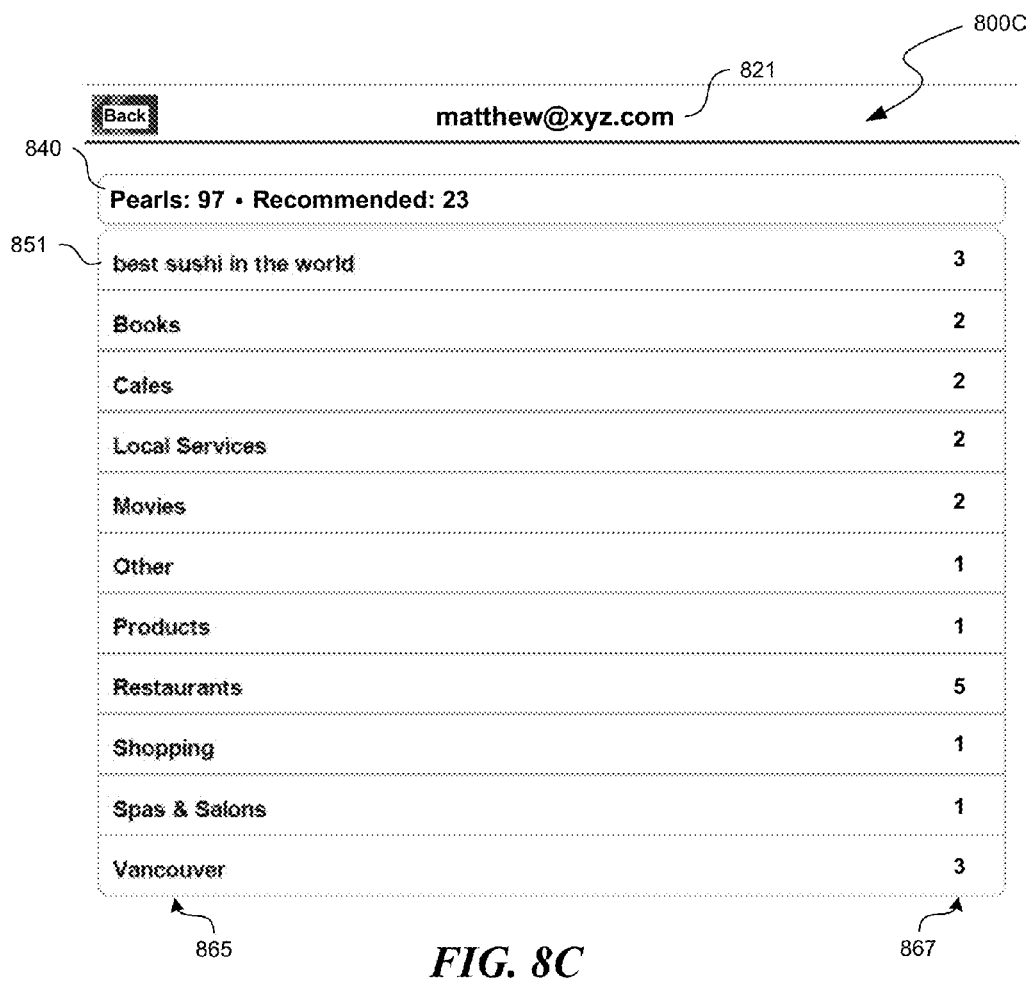

FIG. 8C is a representative screen display 800C that is generated after an individual selects one of the individuals of FIG. 8B (e.g., individual 821). A summary bar 840 provides a summary of the number of saved items (aka "pearls") for the selected individual as compared to a number of recommended items. The remainder of the display includes list of all items that are recommended by the individual, broken down by category. Each category is summarized by a category name 865 and a number of recommended items 867 in that category. Category names may be default names that are applied by the system or custom category names that are specified by the individual. The name column 865 therefore includes categories for the recommended items such as a "best sushi in the world" category 851, a "books" category, a "cafes" category, a "local services" category, a "movies" category, an "other" category, a "products" category, a "restaurants" category, a "shopping" category, a "spas and salons" category, and a "Vancouver" category. It will be appreciated that items may fall into more than one category, allowing an item to be categorized and accessed according to multiple sets of interests on the part of an individual.

Figure 8D:

FIG. 8D is a representative screen display 800D that is provided after an individual selects a category from FIG. 8C (e.g., the "best sushi in the world" category 851). A descriptor area 852 identifies the individual who made the recommendations in addition to the name of the category. A recommended items area 870 lists the recommended items in the category such as an "ABC Sushi restaurant" item, a "DEF Sushi restaurant" item, and a "GHI Sushi restaurant" item. Selecting any of the items in the recommended items area 870 causes a detail page associated with the selected item to be displayed.

Figure 9A:
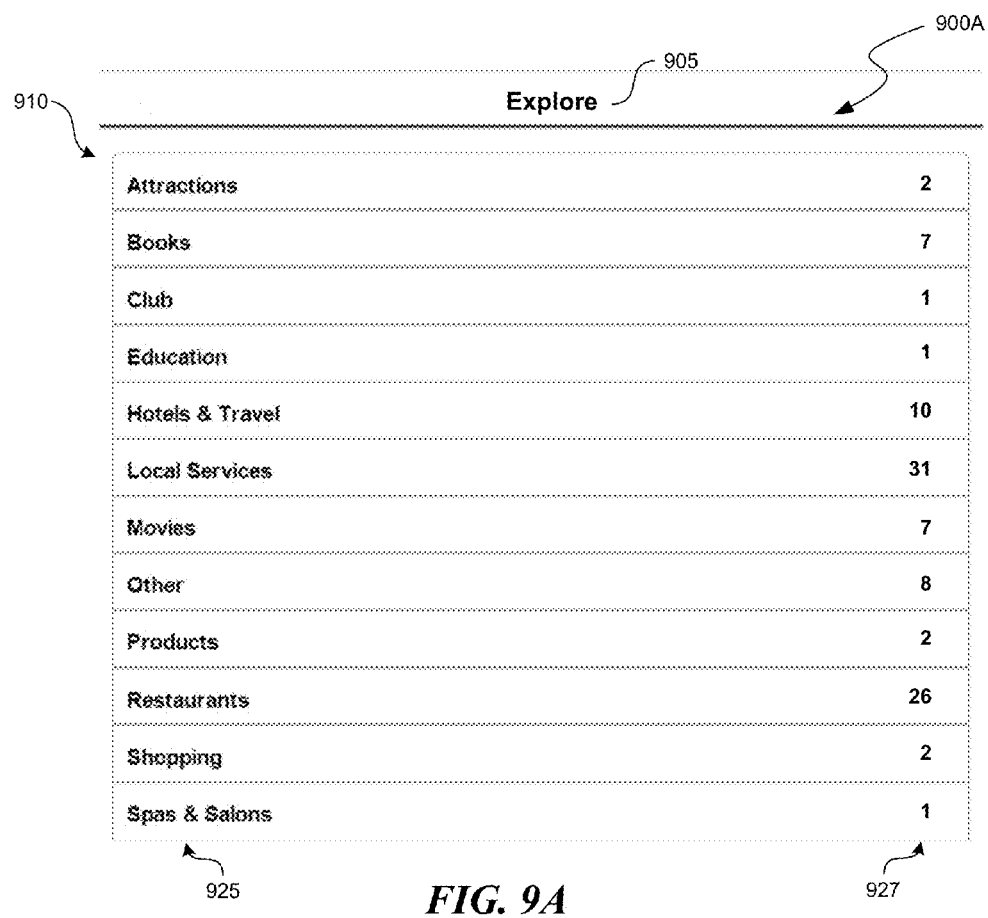
FIGS. 9A and 9B are diagrams of screen displays illustrating the viewing of all recommended items from the combined accounts of all of the individuals who are part of the viewer's sharing network.
Figure 9B:

FIGS. 9A and 9B are diagrams of representative screen displays 900A and 900B generated by the system 100 which allow an individual to view the recommended items from the combined accounts of all individuals who are part of the viewer's sharing network. The screen display 900A is provided after an individual selects the explore menu option 813 from the drop down menu 810 of FIG. 8A. An indicator area 905 indicates the current explore view, and a category area 910 indicates all of the categories for the combined recommended items from all individuals within the individual's sharing network. The category area 910 includes a category name column 925 and a number of recommended items column 927. The category name column 925 includes categories, many of which are similar or identical to the categories of FIG. 8C. In one implementation, the category area 910 generally includes only standardized categories from the meta-catalog. In other words, any recommended items that an individual had grouped into a customized category (e.g., the "best sushi in the world" category 851 of FIG. 8C) are included in the general explore view process in more standardized categories used in the meta-catalog (e.g., the "restaurants" category). The recommended items column 927 includes a count of the number of recommended items that individuals have collectively made for that item. When calculating the number of recommended items, recommendations are not double-counted. In other words, it three individuals recommend the same book in the books category, the system will reflect it as a single item count in the recommended items column 927. Selection of any category in the category area 910 takes the user to a detailed list of the recommended items in that category.

FIG. 9B is a representative screen display 900B that is provided after an individual selects a particular category from FIG. 9A (e.g., the "shopping" category). The name of the category is at the top of the display, and a results area 930 presents the recommended items included in the category. For each of the recommended items, an indication of the individual who recommended the item is provided. For example, for the recommended "ABC shop" item 931, the individual "matthew@xyz.com" who had marked the item as recommended in his account, is indicated. Similarly, for the recommended "DEF shop" item 932, the individual "ryan@xyz.com" who marked the item as recommended in his account is indicated. While the account holder is identified by an email address in FIG. 9B, it will be appreciated that the account holder might be represented by a name, photo, icon or other known identifier. In some embodiments, if multiple individuals have marked an item as recommended, only the first individual to have marked the item as recommended will be indicated, although a number (e.g., +2) may be provided to indicate how many other individuals from the sharing network have also recommended the item. The other individuals that also recommended the item may be viewed by selecting the first-listed individual.

Figure 10A:
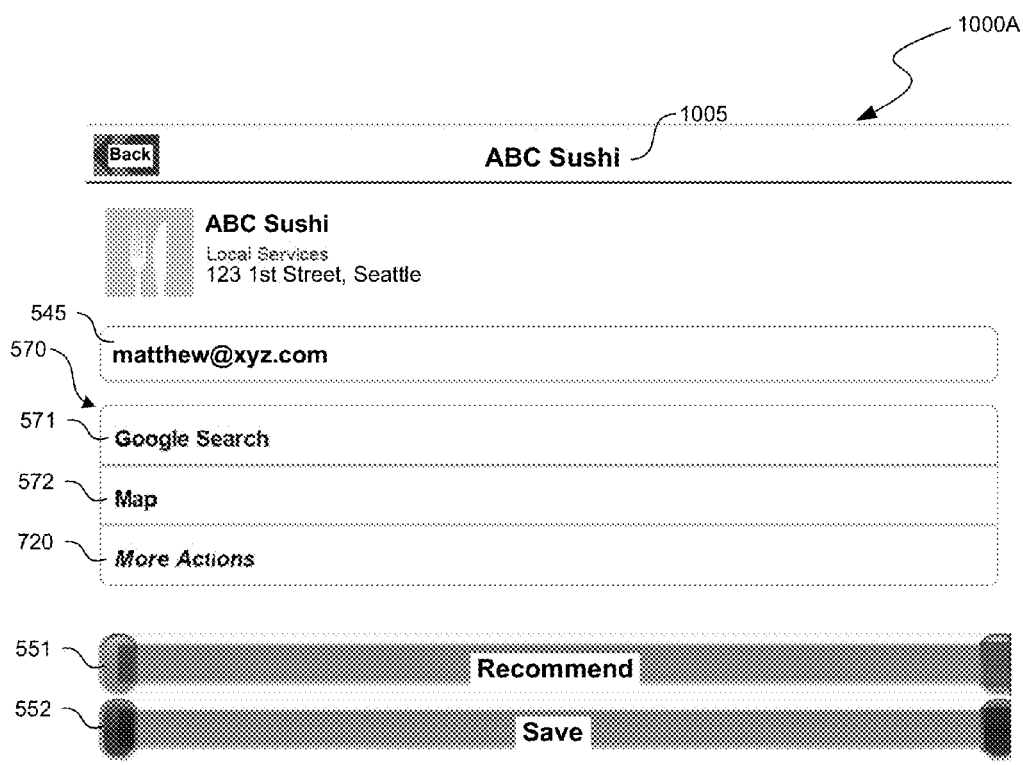
FIGS. 10A-10C are diagrams of screen displays illustrating the viewing, saving and editing of a recommended item in the viewer's account.
Figure 10B:
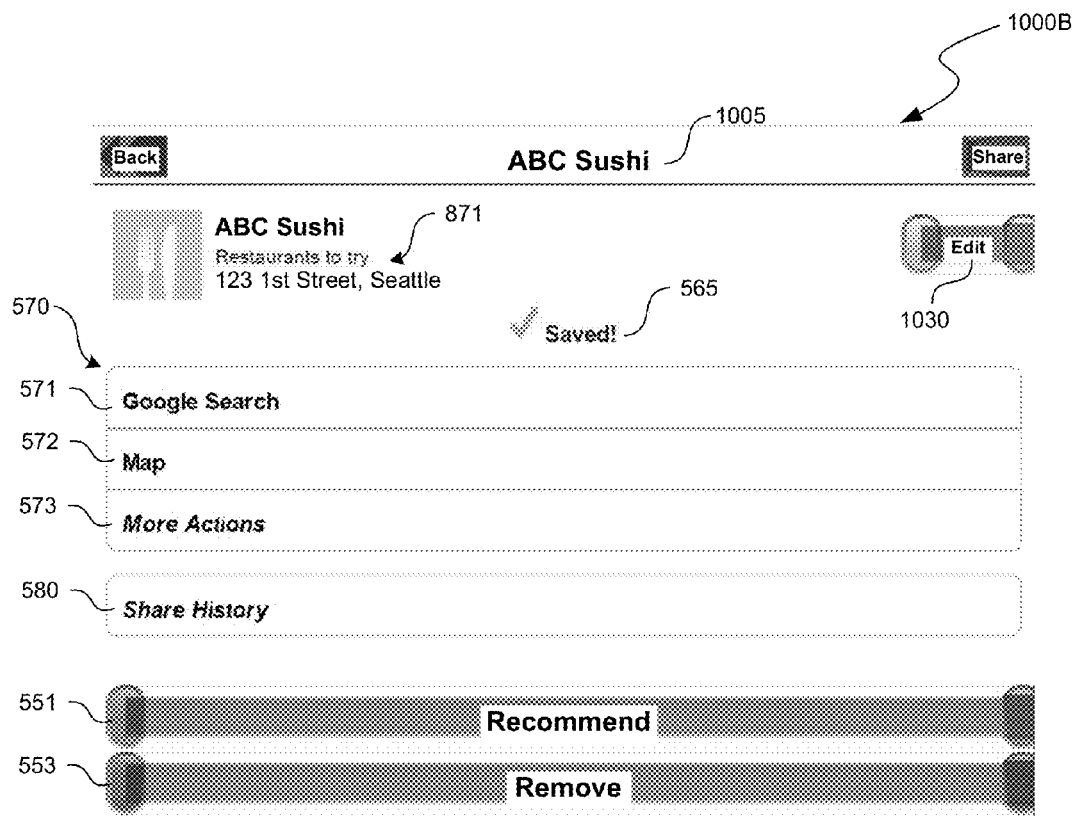
Figure 10C:
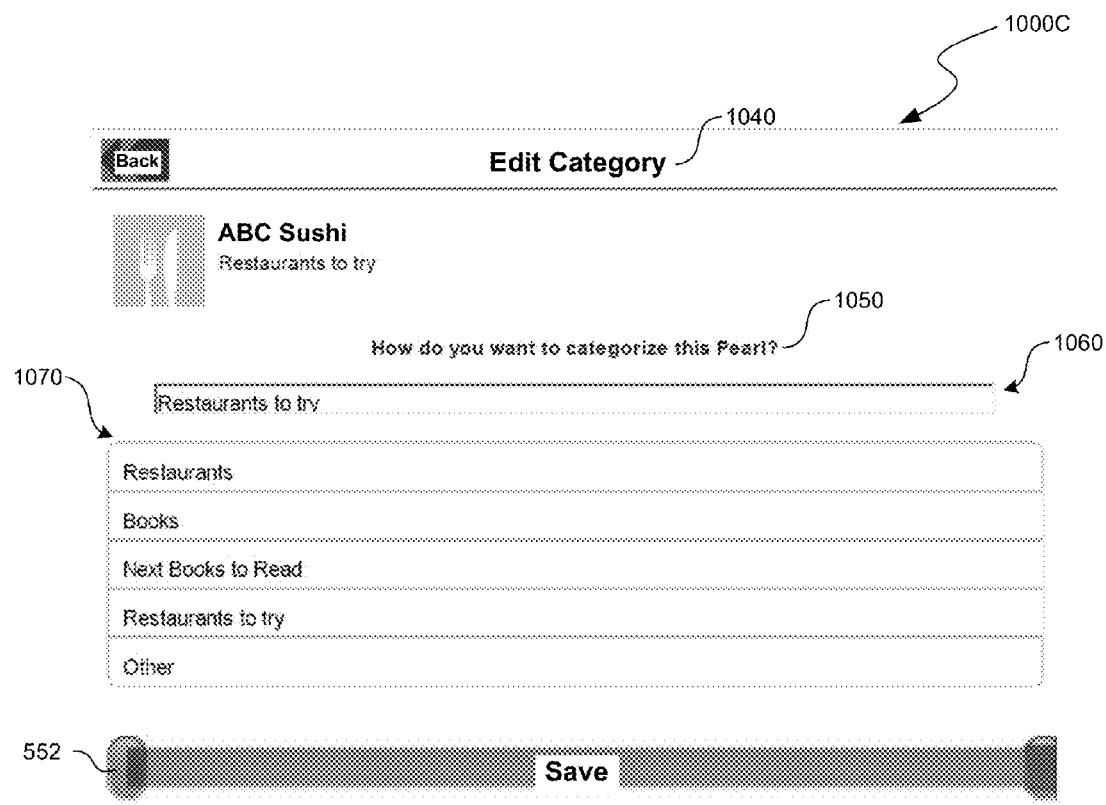

FIGS. 10A-10C are diagrams of screen displays 1000A-1000C generated by the system 100 and illustrating the viewing, saving and editing of a recommended item in the viewer's account. As shown in FIG. 10A, a screen display 1000A is provided after an item that has been marked as recommended in another individual's account is selected. For example, an individual may have selected the recommended "ABC Sushi restaurant" item 871 in FIG. 8D. An item name area 1005 indicates the name of the item, and an indicator area 545 indicates the individual who had marked the item as recommended. The recommend button 551 for recommending the item and the save button 552 for saving the item are provided, as described above with respect to FIG. 5B. As shown in FIG. 10B, the screen display 1000B is provided after an individual has selected the recommend button 551 of FIG. 10A for saving the recommended item into their own account. An indicator area 565 indicates that the item has been saved, and an edit button 1030 for editing the item's category is provided.

As shown in FIG. 10C, the screen display 1000C is provided after an individual selects the edit button 1030 from FIG. 10B for editing the category for the item. An indicator area 1040 indicates the current edit function. An instruction area 1050 indicates that the individual should describe how they want to categorize the item. An entry area 1060 is provided for an individual to type in a name of a category for the item (e.g., "Restaurants to try"). An existing category area 1070 indicates current categories that can be selected to apply as the current categorization. Certain categories may have been customized by the individual in their account, such as the "next books to read" category, the "restaurants to try" category, or the "best sushi in the world" category 851 of FIG. 8C. Other categories such as "books" or "restaurants" are standard categories that are maintained in the meta-catalog. The names of the customized categories may be displayed along with the item when it is shared from the individual's account or when the item is viewed as a recommended item in the individual's account. Over time, as an individual tries certain items, they may move the items from one category to another (e.g. from the "restaurants to try" category to the "restaurants" category). An individual may also apply multiple categories to an item such as "Italian restaurants" and "great date places." As noted above, in various implementations while an item may be placed in a customized category by a particular individual, the item may still be associated with a standardized category in the meta-catalog of items that is maintained by the system. Examples of such standardized categorizations are illustrated in the explore view of FIG. 9A, and may be utilized for generally tracking types of items as they are shared and recommended between different individuals and sharing networks.

Figure 11:
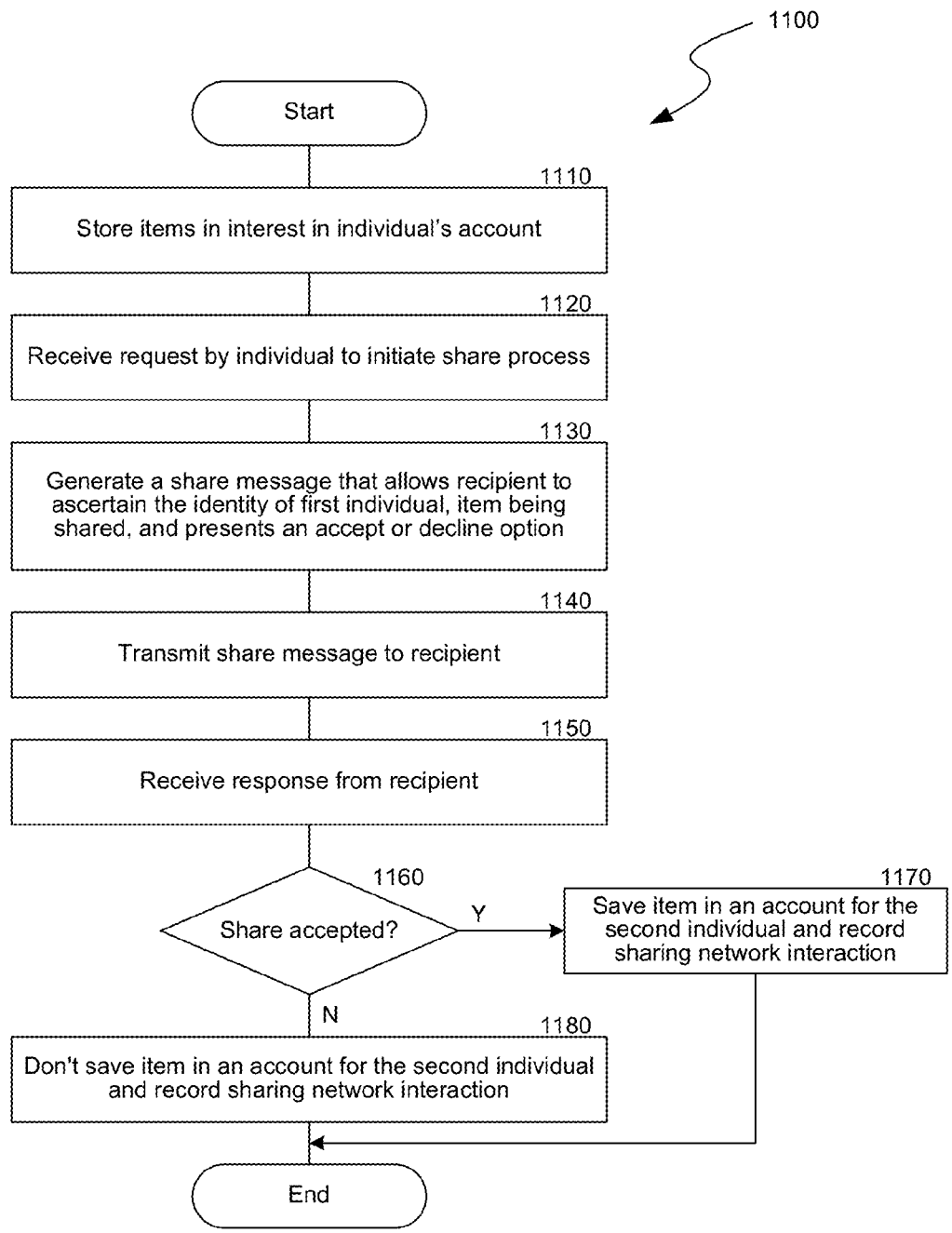
FIG. 11 is a flowchart showing a method implemented by the person-to-person item recommendation system for a share of an item with an option for the recipient to accept or decline the share.

FIG. 11 is a flowchart showing a method 1100 implemented by the person-to-person item recommendation system 100 for a share of an item with an option for the recipient to accept or decline the share. At a block 1110, items of interest are received from a first individual and saved in an account that is associated with the first individual. At a block 1120, a request is received from the first individual to initiate a share process for sharing a saved item from the first individual's account with a second individual. At a block 1130, a share message is generated for sending the item share to the second individual. The share message may include the identity of the first individual, the item being shared, and an option for accepting the share or declining the share. Alternatively, the share message may re-direct the recipient to a web page or application that provides that information to the recipient. At a block 1140, the share message is transmitted to the recipient for consideration.

At a block 1150, the system receives a response to the share message. At a decision block 1160, the system determines whether the second individual accepted the share. If the second individual accepted the share, then processing continues to a block 1170 where the item is saved in an account for the second individual and a sharing network interaction is recorded by the system. If the individuals did not already have a bond, a network sharing bond between the individuals is created by the system. If the individuals were already part of the same sharing network, however, the system may increase the value of the bond between the individuals as a result of the additional share. If the second individual did not accept the share, then processing continues to a block 1180 where the item is not saved in an account for the second individual and a sharing network interaction may be recorded by the system. If the individuals did not already have a bond, the system does not record an interaction because no sharing network exists. If the individuals did already have a bond, the system may decrease the value of the bond between the individuals as a result of the decline. A record is kept by the system 100 of whether the second individual accepted the share or declined the share.

Figure 12:
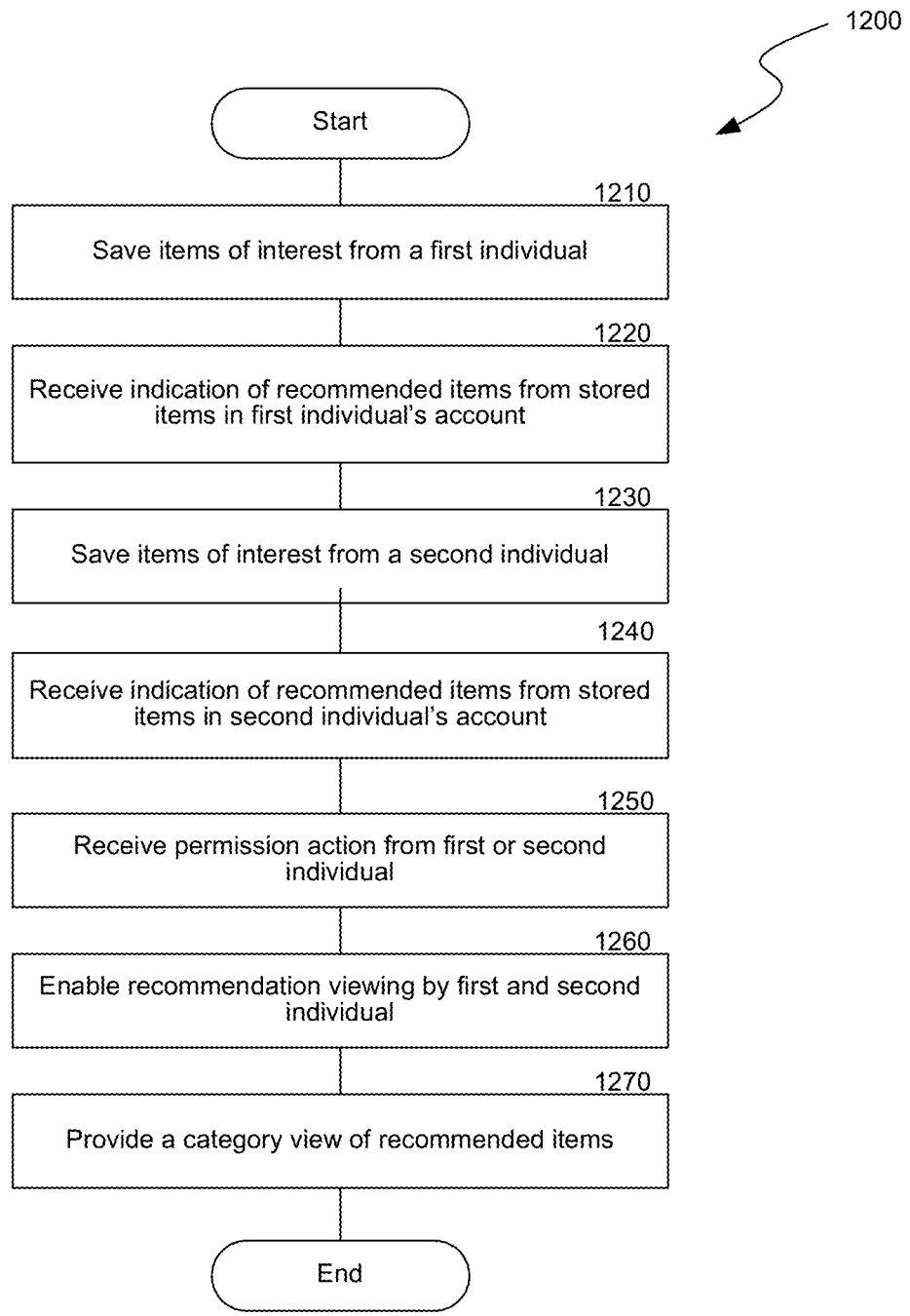
FIG. 12 is a flowchart showing a method implemented by the person-to-person item recommendation system for allowing an individual to view recommended items in another individual's account as grouped into categories.

FIG. 12 is a flowchart showing a method 1200 implemented by the person-to-person item recommendation system 100 for allowing an individual to view recommended items in another individual's account. At a block 1210, an indication of items of interest are received from a first individual and are saved in an account that is associated with the first individual. At a block 1220, the system receives an indication from the first individual of an item or items in the first individual's account that are to be designated as recommended items. In response to the received indication, the system stores a recommended status in association with the item or items in the first individual's account. In general, the set of recommended items in the first individual's account will be a subset of the set of saved items (i.e., only some of the saved items in the individual's account will typically be designated as recommended items). At a block 1230, an indication of items of interest are received from a second individual and are saved in an account that is associated with the second individual. At a block 1240, the system receives an indication from the second individual of an item or items in the second individual's account that are to be designated as recommended items. In response to the received indication, the system stores a recommended status in association with the item or items in the second individual's account. In general, the set of recommended items in the second individual's account will be a subset of the set of saved items (i.e. only some of the saved items will be designated as recommended items).

At a block 1250, a permission action is received by the system. A permission action is an action performed by both individuals that reflects a willingness to allow each individual to view the recommended items in the other's account. As described above, one example of a permission action is an item sharing between two individuals. If an individual shares an item that is accepted by another individual, or if an individual receives and accepts a shared item, the system interprets the willingness to share between the individuals as permission to allow both individuals to see each other's recommended items. At a block 1260, the first individual is therefore enabled to view the recommended items in the second individual's account, and the second individual is enabled to view the recommended items in the first individual's account, based on the permission action having been received. At a block 1270, a category view is provided wherein categories are displayed into which the recommended items in an individual's account have been grouped.

In some embodiments, the system 100 may provide an option to allow a first individual to terminate a second individual's ability to see the first individual's recommended items. Such a feature may be desirable, for example, when the two individuals are no longer friends. In some embodiments, the system 100 may also require more confirmation than an item share to allow another individual to access the sharer's recommendations. For example, an individual asked for a restaurant recommendation by a stranger on the street corner may want to share a recommendation, but not allow the stranger to access all of the recommendations of the individual. As a result, the system may provide an option for an individual to share an item without the share considered as a permission action.

From the foregoing, it will be appreciated that specific embodiments of the invention have been described herein for purposes of illustration, but that various modifications may be made without deviating from the scope of the invention. For example, those skilled in the art will appreciate that the depicted flow charts may be altered in a variety of ways. More specifically, the order of the steps may be re-arranged, steps may be performed in parallel, steps may be omitted, other steps may be included, etc. Accordingly, the invention is not limited except as by the appended claims.

We claim:

1. A method in a computing system for person-to-person viewing of recommended items, the method comprising:
   receiving entries of items of interest from a first individual and saving them as a set of saved items in an account that is associated with the first individual;
   designating a saved item in the first individual's account as a recommended item when input is received from the first individual for designating the item as a recommended item, the designation adding the recommended item to a set of recommended items associated with the first individual, the set of recommended items in the first individual's account being a subset of the set of saved items in the first individual's account;
   receiving entries of items of interest from a second individual and saving them as a set of saved items in an account that is associated with the second individual;
   designating a saved item in the second individual's account as a recommended item when input is received from the second individual for designating the item as a recommended item, the designation adding the recommended item to a set of recommended items associated with the second individual, the set of recommended items in the second individual's account being a subset of the set of saved items in the second individual's account;
   enabling the first individual to be able to view the set of recommended items in the second individual's account based on received permission action performed between the second individual and the first individual, the permission action comprising:
      the second individual initiating a share process for sharing a saved item from the second individual's account with the first individual; and
      the first individual accepting the share process;
      wherein the set of recommended items in the second individual's account includes an item other than the item shared by the second individual; and
   providing a category view wherein categories into which the set of recommended items in the second individual's account have been grouped are displayed.

2. The method of claim 1, wherein the category view comprises a single page in which the categories are listed, the items in a category being displayed once a category is selected.

3. The method of claim 1, wherein a set of recommended items in a third individual's account may also be viewed by the first individual, and an explore view is provided in which categories are displayed for a combined set of recommended items from the second and third individuals' accounts.

4. The method of claim 3, wherein when a category is selected from the explore view, the recommended items in that category from both the second and third individuals are displayed, and an indication is provided for each item as to which individual designated it as recommended.

5. The method of claim 4, wherein when an item has been marked as recommended by both the second and third individuals, only the individual who first marked the item as recommended is indicated.

6. The method of claim 1, further comprising:
   enabling the second individual to be able to view the set of recommended items in the first individual's account based on a received permission action performed between the first individual and the second individual, the permission action comprising:
      the first individual initiating a share process for sharing a saved item from the first individual's account with the second individual; and
      the second individual accepting the share process;
      wherein the set of recommended items in the first individual's account includes an item other than the item shared by the first individual; and
   providing a category view wherein the set of recommended items in the first individual's account can be viewed by the second individual as grouped into categories.

7. The method of claim 1, wherein the share process comprises:
   generating a share message for sending the share to the first individual;

providing the first individual with the identity of the second individual and the item being shared; and providing the first individual with an option for accepting the share or declining the share.

8. The method of claim 1, further comprising enabling the first individual to be able to save a recommended item from the second individual's account to the first individual's account.

9. The method of claim 8, further comprising recording in a data file associated with the recommended item a time stamp indicating when the first individual saved the recommended item from the second individual's account.

10. The method of claim 8, wherein the process for saving an item in an individual's account comprises storing a link for the item, the link being directed to an entry for the item in a master catalog of items that is maintained.

11. The method of claim 8, further comprising enabling the first individual to be able to create a custom category for the recommended item that is saved from the second individual's account, the custom category being different from a category associated with the item in the second individual's account.

12. The method of claim 11, wherein the name of the custom category is displayed as associated with the item when the first individual marks the item as recommended and the item is viewed by other individuals as a recommended item from the first individual's account.

13. The method of claim 11, wherein an explore view is provided in which categories are displayed for a combined set of recommended items from a plurality of individuals in a sharing network, and the item that the first individual associated with the custom category in the first individual's account is instead grouped into a standardized category for the purposes of the explore view.

14. The method of claim 1, further comprising providing action links that are displayed and associated with a saved item.

15. The method of claim 1, wherein different action links are provided for different categories of items, including at least a first action link for a first category for purchasing the item from an external website, a second action link for a second category for making a reservation at the item, and a third action link for a third category for mapping directions to the item.

16. A non-transitory computer readable storage medium with instructions stored thereon that, when executed by a computing system, cause the computing system to perform a method for person-to-person viewing of recommended items, the method comprising:

receiving entries of items of interest from a first individual and saving them as a set of saved items in an account that is associated with the first individual;

designating a saved item in the first individual's account as a recommended item when input is received from the first individual for designating the item as a recommended item, the designation adding the recommended item to a set of recommended items associated with the first individual, the set of recommended items in the first individual's account being a subset of the set of saved items in the first individual's account;

receiving entries of items of interest from a second individual and saving them in a set of saved items in an account that is associated with the second individual;

designating a saved item in the second individual's account as a recommended item when input is received from the second individual for designating the item as a recommended item, the designation adding the recommended item to a set of recommended items associated with the second individual, the set of recommended items in the second individual's account being a subset of the set of saved items in the second individual's account;

enabling the first individual to be able to view the set of recommended items in the second individual's account based on a received permission action performed between the second individual and the first individual, the permission action comprising:

the second individual initiating a share process for sharing a saved item from the second individual's account with the first individual; and the first individual accepting the share process;

wherein the set of recommended items in the second individual's account includes an item other than the item shared by the second individual; and providing a category view wherein categories into which the set of recommended items in the second individual's account have been grouped are displayed.

17. The non-transitory computer readable storage medium of claim 16, wherein the category view comprises a single page in which the categories are listed, the items in a category being displayed once a category is selected.

18. The non-transitory computer readable storage medium of claim 16, wherein a set of recommended items in a third individual's account may also be viewed by the first individual, and an explore view is provided in which categories are displayed for a combined set of recommended items from the second and third individuals' accounts.

19. The non-transitory computer readable storage medium of claim 18, wherein when a category is selected from the explore view, the recommended items in that category from both the second and third individuals are displayed, and an indication is provided for each item as to which individual designated it as recommended.

20. The non-transitory computer readable storage medium of claim 16, wherein the method further comprises enabling the first individual to be able to save a recommended item from the second individual's account to the first individual's account.

21. The non-transitory computer readable storage medium of claim 20, wherein the method further comprises recording in a data file associated with the recommended item a time stamp indicating when the first individual saved the recommended item from the second individual's account.

22. The non-transitory computer readable storage medium of claim 20, wherein the process for saving an item in an individual's account comprises storing a link for the item, the link being directed to an entry for the item in a master catalog of items that is maintained.

23. The non-transitory computer readable storage medium of claim 20, wherein the method further comprises enabling the first individual to be able to create a custom category for the recommended item that is saved from the second individual's account, the custom category being different from a category associated with the item in the second individual's account.

24. The non-transitory computer readable storage medium of claim 23, wherein the name of the custom category is displayed as associated with the item when the first individual marks the item as recommended and the item is viewed by other individuals as a recommended item from the first individual's account.

25. The non-transitory computer readable storage medium of claim 23, wherein an explore view is provided in which categories are displayed for a combined set of recommended items from a plurality of individuals in a sharing network, and the item that the first individual associated with the custom category in the first individual's account is instead grouped into a standardized category for the purposes of the explore view.

26. The non-transitory computer readable storage medium of claim 16, wherein the method further comprises providing action links that are displayed and associated with a saved item.

27. The non-transitory computer readable storage medium of claim 16, wherein different action links are provided for different categories of items, including at least a first action link for a first category for purchasing the item from an external website, a second action link for a second category for making a reservation at the item, and a third action link for a third category for mapping directions to the item.

* * * * *